United States Patent [19]
Freissle et al.

[11] Patent Number: 5,938,042
[45] Date of Patent: Aug. 17, 1999

[54] THIN SUPPORT FRAME

[76] Inventors: Manfred Franz Axel Freissle, 15 Oak Avenue, Oakdene; Jacobus Van Rensburg, 39 Norwich Drive, Milbarton; Peter Helmut Franz Freissle, 15 Oak Avenue, Oakdene, all of Johannesburg, Gauteng, South Africa

[21] Appl. No.: 08/844,898

[22] Filed: Apr. 22, 1997

[30] Foreign Application Priority Data

Apr. 23, 1996 [ZA] South Africa ............................ 96/3232

[51] Int. Cl.⁶ ................................ B07B 1/49; B07B 1/46
[52] U.S. Cl. .......................... 209/405; 209/413; 209/408; 403/391; 403/337; 211/180; 245/1.5
[58] Field of Search ..................................... 209/405, 409, 209/412, 414, 408, 347, 286; 403/391, 337; 211/180; 245/1.5

[56] References Cited

U.S. PATENT DOCUMENTS

| 774,966 | 11/1904 | Dickerson | 209/408 |
|---|---|---|---|
| 1,776,133 | 9/1930 | Prindle | 403/391 |
| 4,882,044 | 11/1989 | Freissle | 209/408 |
| 5,464,101 | 11/1995 | Freissle | 209/403 |

FOREIGN PATENT DOCUMENTS

| 43963 | of 0000 | Germany | 403/391 |
|---|---|---|---|
| 566298 | 12/1932 | Germany | 403/391 |
| 940452 | 1/1994 | South Africa . | |
| 950711 | 1/1995 | South Africa . | |

Primary Examiner—William E. Terrell
Assistant Examiner—Joe Dillon, Jr.
Attorney, Agent, or Firm—James Ray & Associates

[57] ABSTRACT

A screening arrangement support frame component in which a pair of complementary elongate component members have body portions and cavity defining formations. The component members are secured side by side to one another such that the body portions abut and the cavity defining formations register to form a plurality of cavities for receiving socket elements. A plurality of socket elements, each defining a socket for receiving a protrusion that secures a screening panel to the component, the socket elements being mounted in the cavities when the component members are secured to one another. The thickness of each support frame component at the locations where the body portions abut is smaller than the cross-sectional dimension of the socket elements mounted in the cavities.

20 Claims, 6 Drawing Sheets

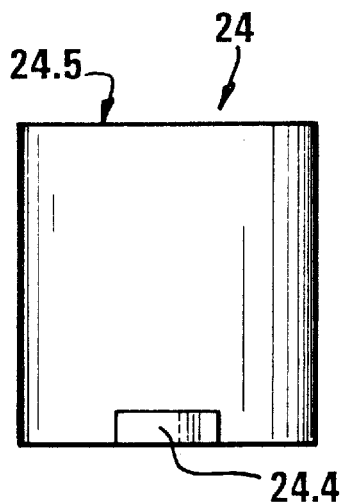
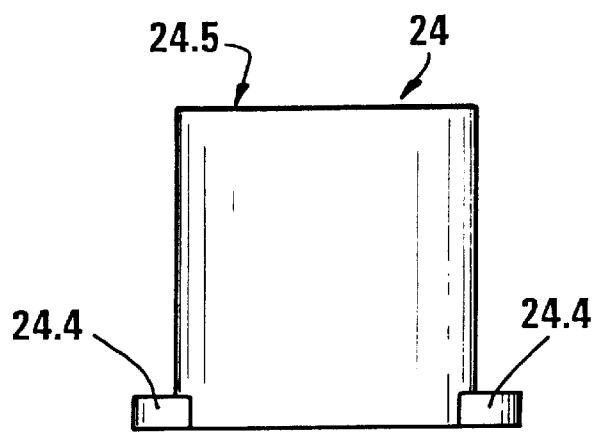
FIG 2          FIG 3
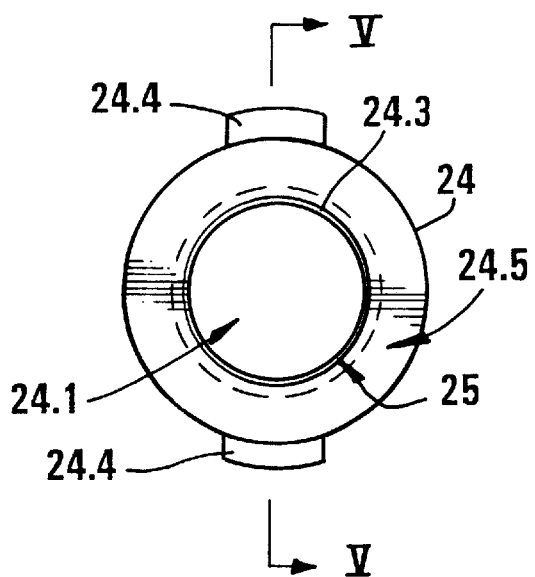
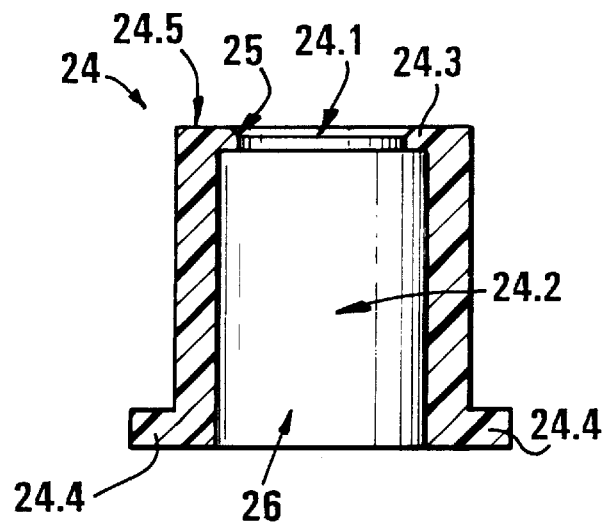
FIG 4          FIG 5

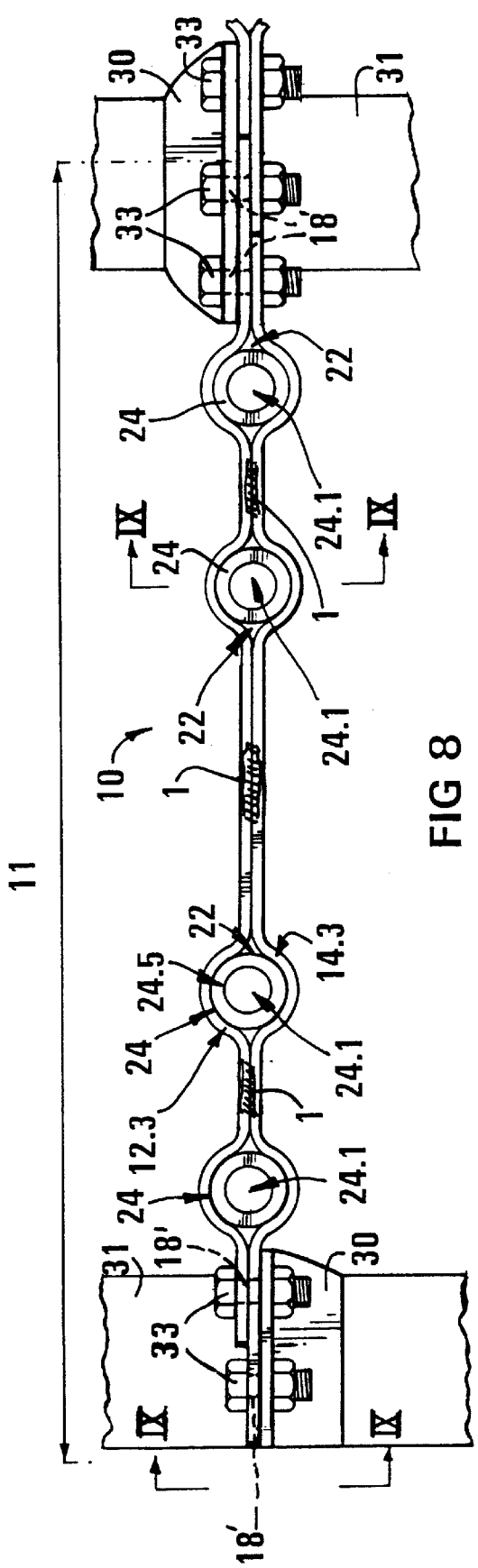
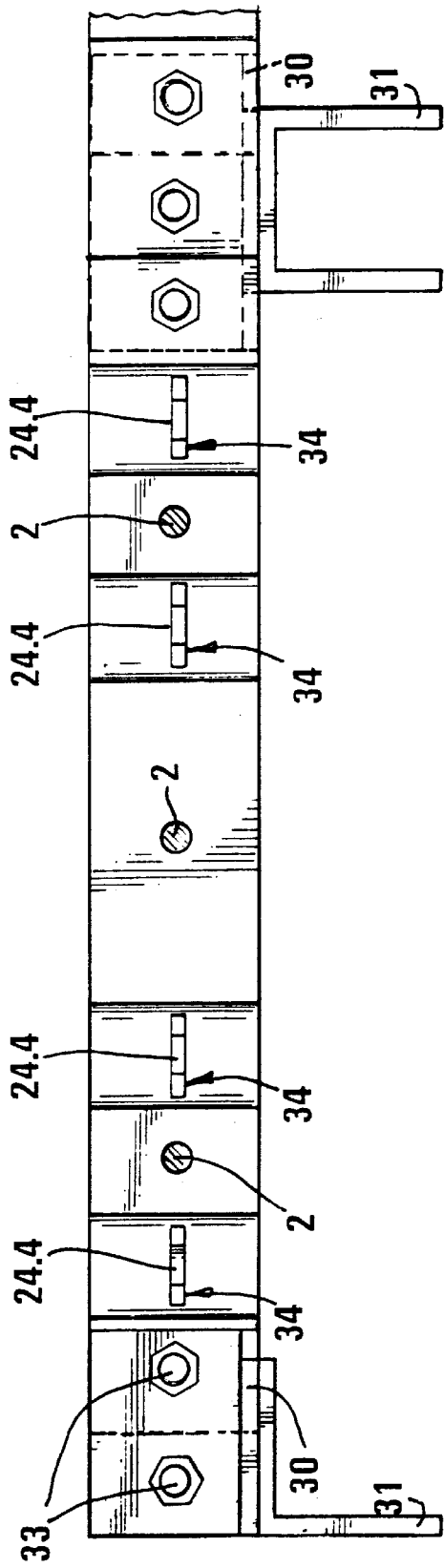
FIG 8
FIG 9

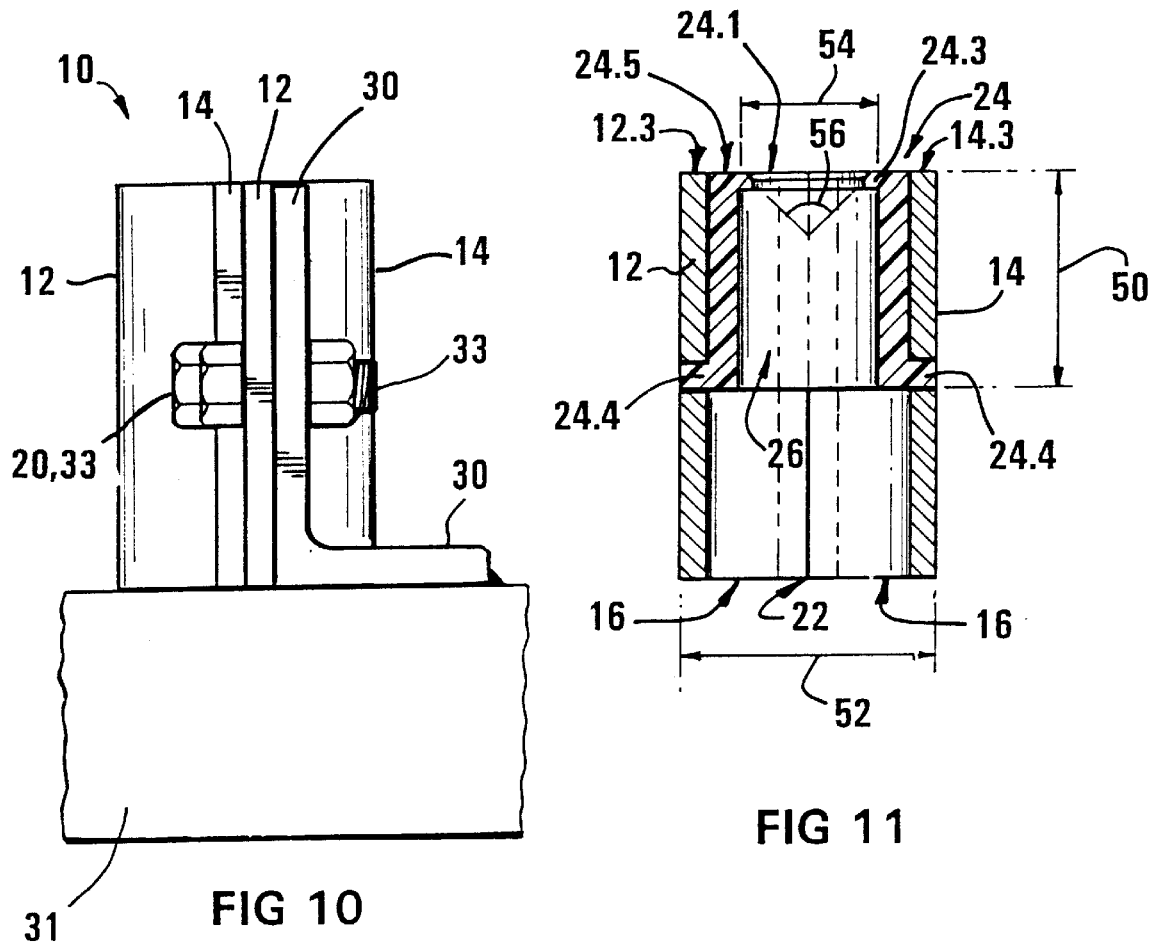
FIG 10
FIG 11
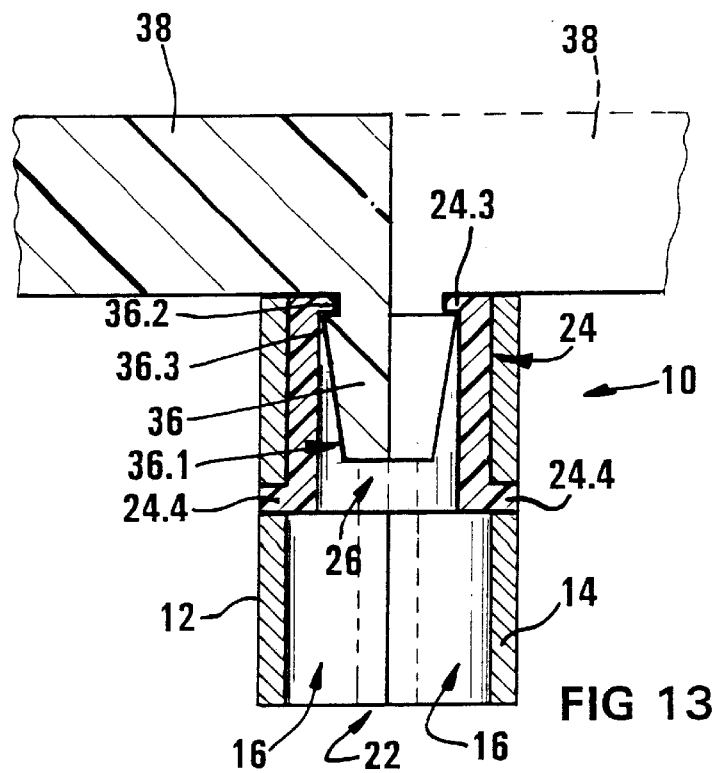
FIG 13

THIN SUPPORT FRAME

THIS INVENTION relates to a screening arrangement. More particularly the invention relates to a screening arrangement for screening particulate material such as mineral ores or the like. In particular the invention relates to a screening arrangement support frame component, to a screening arrangement support frame including such a component, and to a screening arrangement.

A screen support frame is known to the Applicant, which includes a frame member in which spaced sockets are affixed in the frame member to receive and removably secure modular screening panels to the support frame. A screen support frame component is also known to the Applicant, which includes an elongate bar having at least one recess therein in which a tubular element, defining a socket in which securing means for securing a screening panel to the support frame, is receivable, is removably mountable.

It is an object of the present invention to provide a screening arrangement support frame component, a screening arrangement support frame and a screening arrangement which are developments of the screen support frames and components presently known to the Applicant.

According to one aspect of the invention there is provided a screening arrangement support frame component comprising

- a pair of complementary elongate component members comprising body portions and cavity defining formations, the component members being secured side by side to one another such that the body portions abut and the cavity defining formations register to form a plurality of cavities for receiving socket elements;
- a plurality of socket elements, each defining a socket for receiving securing means for securing a screening panel to the component, said socket elements being mounted in the cavities when the component members are secured to one another,
- the thickness of each screening arrangement support frame component where the body portions abut being smaller than the cross-sectional dimension of the socket elements which are mounted in the cavities.

The component members may comprise a pair of elongate flat bars, the cavity defining formations comprising a plurality of depressions spaced along their length, the depressions coming into register with one another when the elongate flat bars are secured to one another to form a plurality of cavities for receiving socket elements.

The depressions may be semi-cylindrical such that when the semi-cylindrical depressions register, cylindrical cavities are formed in the screening arrangement support frame component.

Each depression may be provided with a formation complementary to and inter-engageable with a formation on the socket element, for locating the socket element in the cavity formed when the elongate flat bars are secured to one another.

The socket elements may be tubular elements formed so as to fit snugly within the cylindrical cavities.

Each tubular element may have a circular cross-sectional profile defining a circular cylindrical socket In its interior, and a circular opening into the cylindrical interior of the element for receiving securing means in the form of protrusions on a screening panel.

The circular opening into the tubular element may be provided in a flat surface which is flush with the top surfaces of the elongate flat bars when the tubular element is mounted in the cylindrical cavity in the support frame component.

The circular opening may have an annular, inwardly extending shoulder or peripheral lip to engage the protrusions of the screening panel.

The formation in each semi-cylindrical depression may be a female formation and the formations on the tubular elements may be male formations.

The female formations may be openings in the wall of the semi-cylindrical depression, and the male formations may be pairs of projections, each projection in the pair being provided on an opposite side of the tubular element to the other.

The projections may be in the form of lugs.

The tubular elements may be of a hard-wearing mouldable synthetic plastics material.

The synthetic plastics material may be polyurethane.

The cavities in the component may be spaced longitudinally from each other by distances complementary to spacings between securing means by means of which a screening panel is secured to the component.

In one embodiment of the invention, the component members may be releasably secured to one another by releasable securing means, and the socket elements removably mounted in the cavities.

The releasable securing means may comprise a plurality of transversely extending holes provided along the length of each of said flat bars, at least some of which holes can be brought Into register with one another; and nut and bolt assemblies receivable through the holes, by means of which the elongate flat bars are releasably securable to one another.

In another, preferred embodiment of the invention, the component members may be fixedly secured to one another. The component members may be fixedly secured to one another by welding, e.g. spot welding or slug welding.

A portion of an end of each elongate flat bar in the pair may project in an axial direction beyond the corresponding end of the other elongate flat bar in the pair, to provide an ear which overlaps with and is securable to a corresponding ear in another such component and to connecting means to connect the components to a support beam of a screening arrangement support frame.

The connecting means may comprise a connecting bracket or cleat secured to the support beam and provided with holes which can register with holes provided in the ears of each elongate bar, for receiving securing means e.g. a nut and bolt assembly to removably interconnect the screening arrangement support frame components to the support beam.

A pair of screening arrangement support frame components may be releasably interconnectable end-to-end to one another, and to a screening arrangement support frame to extend across the support frame.

According to another aspect of the invention there is provided a screening arrangement support frame which includes

- a plurality of mutually laterally spaced support beams; and
- a plurality of components in accordance with claim 1 removably connected to the support beams, the components being spaced from and parallel to each other and spaced apart from each other by a distance equivalent to the width of a screening panel.

The screening arrangement support frame may comprise a grid-like structure, which includes a plurality of said components releasably connected by connecting brackets or cleats to transversely extending support beams, the support beams being interconnected and held in mutually spaced relationship by a pair of opposed end beams.

According to a further aspect of the invention there is provided a screening arrangement which includes a screening arrangement support frame in accordance with claim 17; and a plurality of screening panels having securing means received within the sockets to secure the screening panels to the support frame.

According to yet a further aspect of the invention there is provided a socket element for receiving protrusions on a screening panel, the socket element being tubular and defining a socket therewithin, and the socket element being provided with projections on its outer surface adapted to engage openings in a screening arrangement support frame component. The tubular element may have a circular or rectangular cross-sectional profile.

The tubular element may have a circular opening into the interior of the element for receiving protrusions on a screening panel, the circular opening having an annular, inwardly extending shoulder or peripheral lip to engage the protrusions on the screening panel, and a chamfered face to facilitate the insertion of protrusions into the opening.

The projections may be a pair of projections, each projection in the pair being provided on an opposite side of the tubular element to the other.

The projections may be in the form of lugs.

The tubular elements may be of a hard-wearing mouldable synthetic plastics material.

The plastics material may be polyurethane

The invention will now be described by way of example, with reference to the accompanying diagrammatic drawings, in which:

FIG. 2 shows an end view of a socket element of a screening arrangement support frame component of FIG. 1;

FIG. 3 shows a side view of the socket element of FIG. 2;

FIG. 4 shows a plan view of the socket element of FIG. 2;

FIG. 5 shows a longitudinal section on line V—V of the socket element of FIG. 4;

FIG. 8 shows a fragmentary plan view of another embodiment of a screening arrangement support frame component of the invention with the elongate bars fixedly secured to one another and portions of another screening arrangement support frame component connected end-to-end thereto and to support beams of a screening arrangement support frame;

FIG. 9 shows a fragmentary plan view of another version of the embodiment of FIG. 8;

FIG. 10 shows on an enlarged scale an end elevation view taken at X—X of the screening arrangement support frame components shown in FIGS. 6 and 8;

FIG. 11 shows on an enlarged scale a section on line XI—XI in FIG. 6;

FIG. 13 shows on an enlarged scale a section on line XI—XI in FIG. 12.

Figure 1:
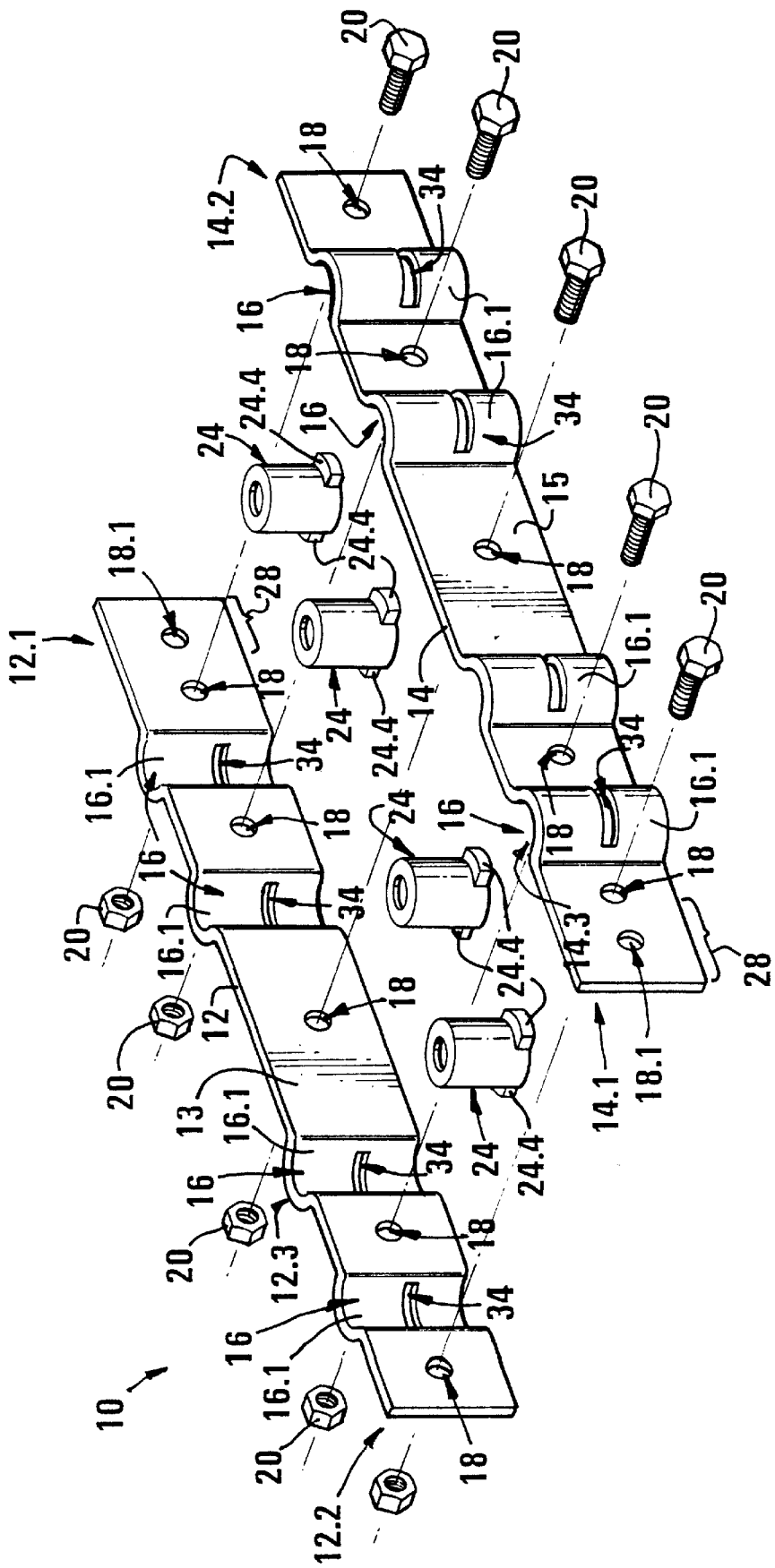
FIG. 1 shows a three dimensional exploded view of a screening arrangement support frame component in accordance with one embodiment of the invention.

In the drawings, reference numeral 10 generally indicates a screening arrangement support frame component according to the invention.

Referring to FIG. 1 and FIGS. 6 to 10 of the drawings, the screening arrangement support frame component 10 comprises a pair of complementary component members in the form of elongate steel flat bars 12 and 14 having body portions 13 and 15 respectively. Each flat bar 12 and 14 has a rectangular cross-sectional profile and is formed with a plurality of semi-cylindrical depressions 16 spaced along its length. In the embodiment shown in FIGS. 1, 6 and 7, each of the elongate flat bars 12 and 14 is further provided with a plurality of transversely extending holes 18 along its length, of which all the holes in one flat bar, except the end-most holes 18.1, can be brought into register with the holes In the other flat bar, to receive nut and bolt assemblies 20 by means of which the elongate flat bars 12 and 14 are releasably securable to one another. The body portions 13 and 15 then abut, and the semi-cylindrical depressions 16 on elongate flat bar 12 will then come into register with corresponding semi-cylindrical depressions 16 on the elongate flat bar 14 to form cylindrical cavities 22 (see FIGS. 6, 11, 12 and 13) into which socket elements in the form of tubular elements 24 are removably mounted. The semi-cylindrical depressions 16 in the elongate flat bars 12 and 14 are provided with openings in the form of arcuate slots 34 in their walls 16.1. The function of the slots 34 will be described more fully with reference to the description of the tubular elements 24 hereunder.

As shown more clearly in FIG. 1 of the drawings, portions 28 of ends 12.1, 14.1 of the elongate flat bars 12 and 14 project in an axial direction beyond the corresponding ends 12.2, 14.2 of the other flat bar, to provide ears 28 through which end-most holes 18.1 are formed.

Referring to FIGS. 2 to 5 of the drawings, in all embodiments of the invention, the tubular element 24 has a circular cross-sectional profile and has a circular opening 24.1 into the Interior 24.2 of the element 24, which interior 24.2 forms a socket for receiving securing means such as protrusions on a screening panel, which will be described in more detail with reference to FIG. 13 hereunder. The circular opening 24.1 has an annular, inwardly extending shoulder or peripheral lip 24.3 to engage the protrusions of the screening panel. The opening 24.1 has a chamfered face 25 to facilitate the insertion of protrusions into the opening. The tubular elements 24 are further provided with pairs of projections in the form of lugs 24.4, each lug in the pair being provided on an opposite side of the tubular element 24 to the other. The tubular elements 24 are of a hard-wearing mouldable synthetic plastics material such as polyurethane.

Referring back to FIG. 1 of the drawings, in this embodiment, when the elongate flat bars 12 and 14 are secured to one another by bolting them together by means of nut and bolt assemblies 20 received through holes 18 therein, the lugs 24.4 fit into the slots 34 and the tubular elements are thereby snugly received and held within the cylindrical cavities 22 which are formed when the semi-cylindrical depressions 16 come into register as the nut and bolt assemblies 20 are tightened. The tubular elements 24 are thereby removably mounted in the screen support frame component 10, as can more clearly be seen in FIGS. 6, 9, 10 and 11 of the drawings. Removal of the tubular elements 24 from the cylindrical cavities 22 during use of a screening arrangement 40 as shown in FIG. 10 of the drawings, is resisted, but they can be removed for replacement when worn, as is described more fully below.

FIGS. 8 and 9 of the drawings show two versions of another preferred embodiment of the invention. In these figures the same reference numerals denote the same features shown in the other figures. In this embodiment, the flat bars 12 and 14 are fixedly secured to one another by welding. In the version shown in FIG. 8, the welding is effected by means of convention spot welds 1, and the flat bars 12 and 14 are not provided with transverse holes 18 along their lengths but are provided at opposite ends thereof with endmost holes 18' for receiving nut and bolt assemblies 33 to secure the components 10 end-to-end to one another and via cleats 30 to support beams 31 of a screening arrangement support frame, which frame is described in more detail below.

In the version shown In FIG. 9, the welding is effected by means of conventional slug welds 2, and at least one of the flat bars 12 and 14 is provided with holes 18 along its length through which the slug weld is effected. Holes 18' are also provided at opposite ends of the flat bars, for receiving nut and bolt assemblies 33 to secure the components 10 end-to-end to one another and via cleats 30 to support beams 31.

Figure 6:
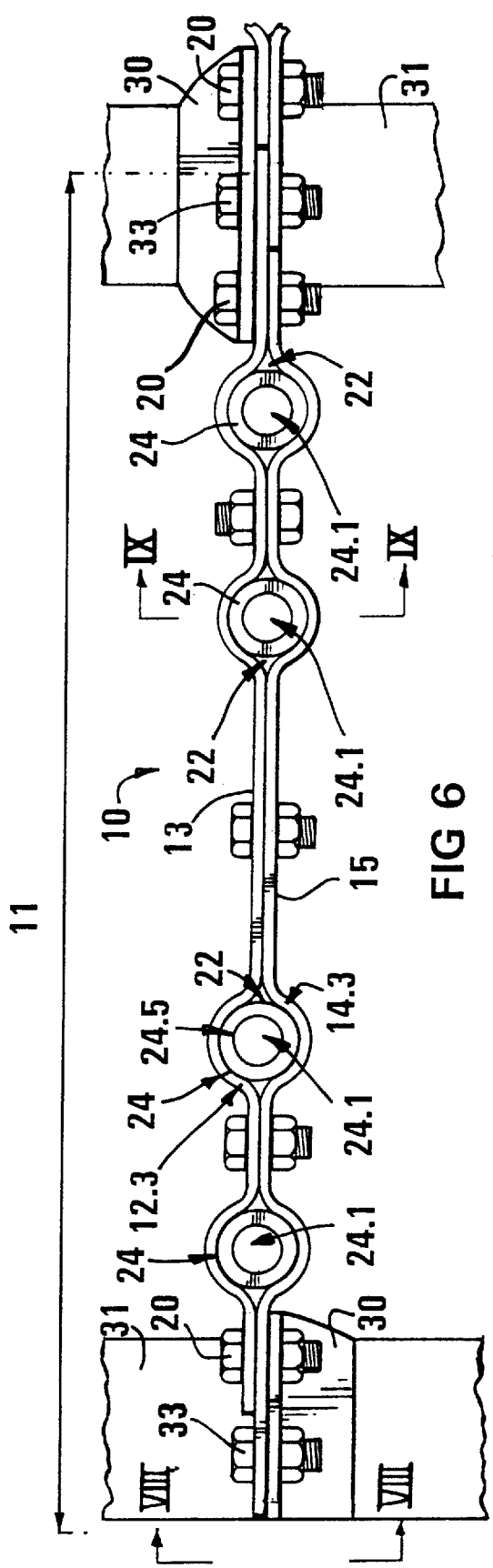
FIG. 6 shows a fragmentary plan view of a screening arrangement support frame component of FIG. 1 with the elongate bars secured to one another and portions of another screening arrangement support frame component connected end-to-end thereto and to support beams of a screening arrangement support frame.
Figure 7:
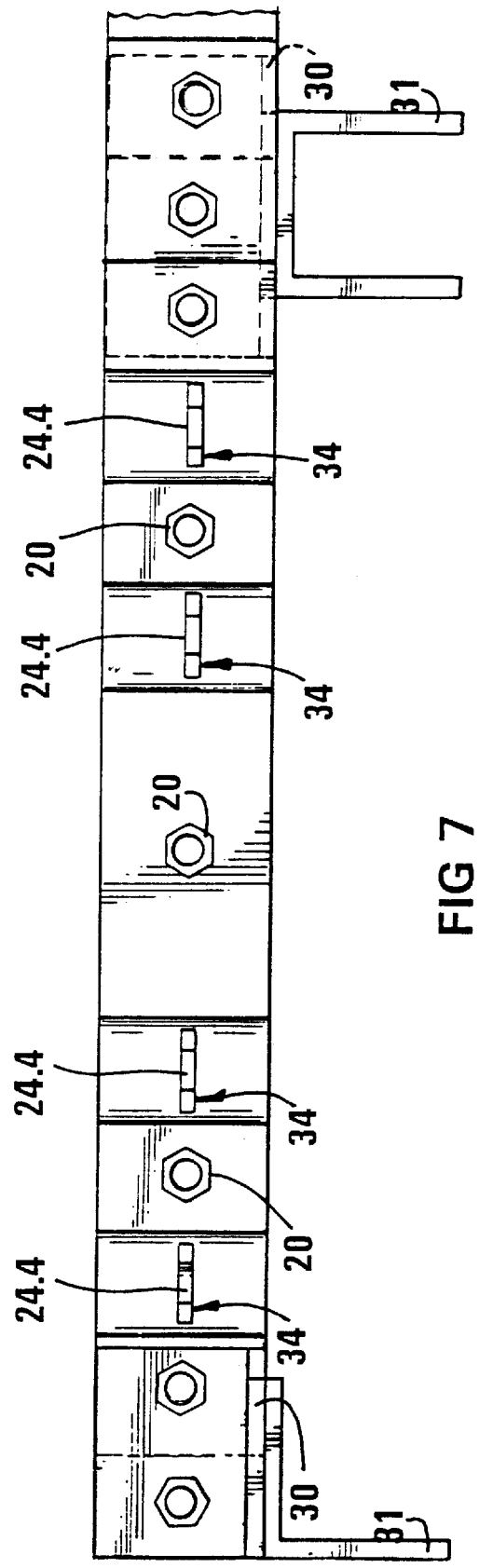
FIG. 7 shows a side view of the screening arrangement support frame components shown in FIG. 6.

Referring to FIGS. 6 and 9 of the drawings, the circular opening 24.1 Into the tubular element 24 is provided in a flat surface 24.5 which is flush with the top surfaces 12.3 and 14.3 of the elongate flat bars 12 and 14 in use when the tubular element 24 is mounted in the cylindrical cavity 22 in the support frame component 10.

Figure 12:
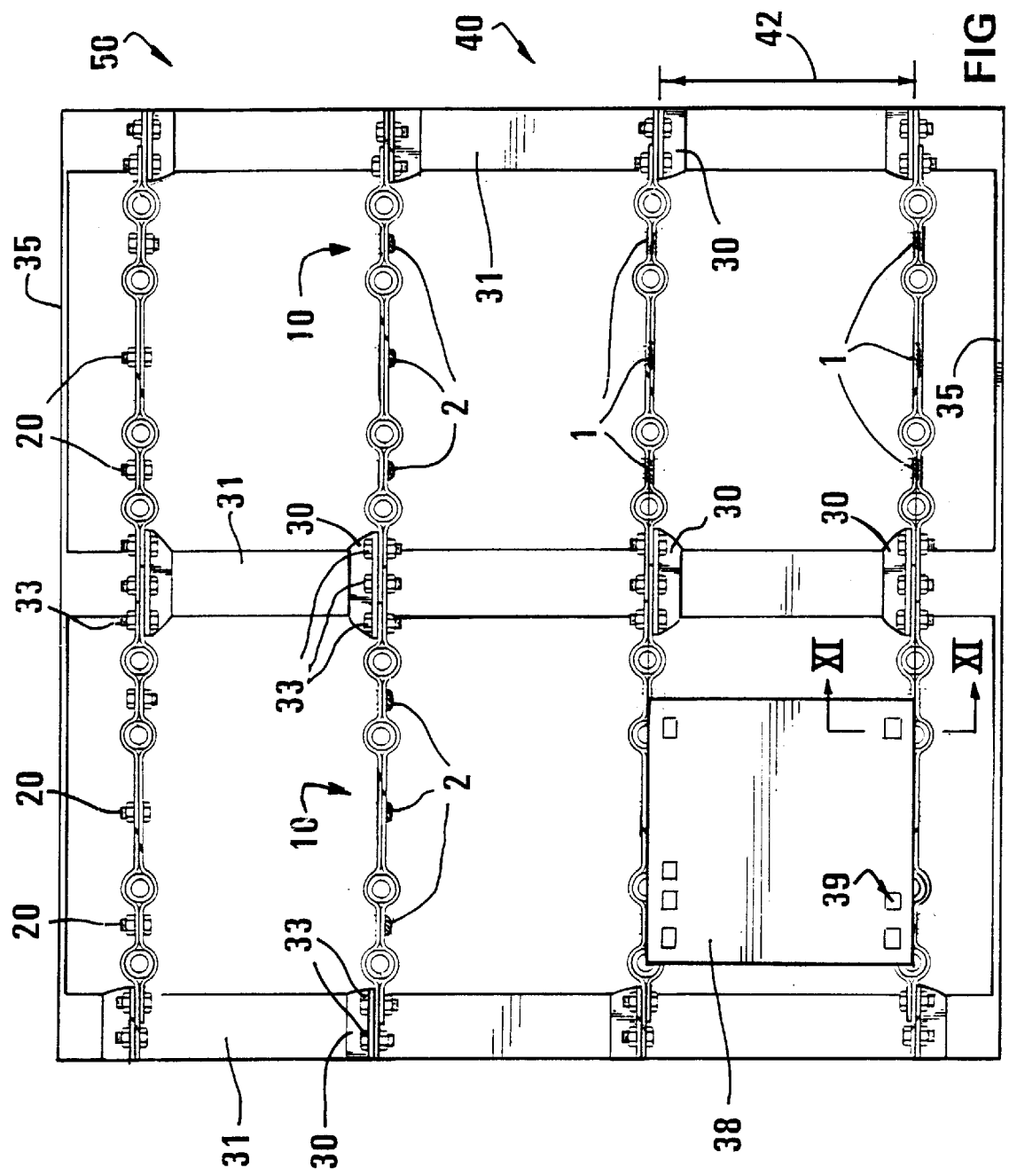
FIG. 12 shows a plan view of a screening arrangement In accordance with the invention.

Referring to FIG. 8 of the drawings, four tubular elements 24 are provided in the screen support frame component 10. The tubular elements 24 are spaced longitudinally from each other by distances complementary to the spacing between protrusions by means of which screening panels (as shown in FIGS. 12 and 13 of the drawings) can be secured to the screen support frame component 10. Cleats 30 are welded to support beams 31 of a screening arrangement support frame which will be described in more detail with reference to FIG. 12. The cleats 30 are for securing the screen support frame component 10 to the support frame and to another such screen support frame component 10 end-to-end. The cleats 30 are provided with holes (not shown) which register with holes 18 and 16.1 in the screen support frame component 10, and which receive nut and bolt assemblies 20 and 33 to secure the component 10 to the beams 31.

The tubular elements 24 are arranged to support a screening panel 38 having a pair of longitudinally spaced securing protrusions 36 on each of two opposite sides of the panel, as is described in more detail with reference to FIG. 13. The screen support frame component 10 has an overall length 11 of 610 mm in this embodiment, which is equal to two screening panels of 305 mm×305 mm size. It may, however, be manufactured in lengths of 1220 mm or whatever length may be desired.

Referring to FIGS. 10 and 11, the tubular element 24 is shown mounted between the elongate flat bars 12 and 14 to form the screen support frame component 10. The tubular element 24 has a height 50 and a width 52 between the outer ends of the lugs 24.4. In a particular arrangement the height 50 may be 45 mm and the width 52 may be 50 mm. The opening 24.1 may have a diameter 54 which in a particular configuration may be 23 mm. An angle 56 is included between the sloping faces of the chamfer 25. and the angle 66 may be 90°.

Referring now to FIG. 12 of the drawings, reference numeral 40 generally indicates a screening arrangement support frame. The support frame 40 comprises four pairs of screen support frame components 10 two of which are according to the version of FIG. 8, one according to the version of FIG. 9, and one according to the version of FIG. 1, each pair being removably secured in end-to-end relationship to one another and removably connected to the support beams 31, via the cleats 30 and nut and bolt assemblies 20 and 33. Instead, the support frame components 10 could be welded to the cleats 30, or directly onto the support beams 31. The pairs of screen support frame components 10 are spaced from each other along the beams 31. A plurality of screening panels 38 having screening apertures 39 is positioned on the support frame 40. In the arrangement shown in FIG. 12, the screening panel 38 is dimensioned 305 mm×305 mm. The dimension 42 which is the centre-line to centre-line spacing between the elongate flat bars 12 and 14 of each individual support frame component 10, are each also 305 mm. If the thickness of each of the elongate flat bars 12 and 14 is 5 mm it means that when the screening panel 38 is placed on the support frame 40, it covers one half of the width of the combined thickness of the two elongate flat bars 12 and 14 i.e. in this particular configuration a space of 5 mm. The effect of this is that when another identical screening panel 38 is placed on the support frame 40 adjacent the first screening panel 38, the screening panels abut each other and are each supported on half the width of the support frame components 10, i.e. each Is supported on a width of 5 mm of the elongate flat bars 12 and 14. The screening arrangement support frame 40 is a grid-like structure, and includes a pair of opposed end beams 35 which interconnect the support beams 31 and holds them in mutually spaced relationship. A screening arrangement according to the invention, generally designated by reference numeral 50, comprises a support frame 40 and a plurality of screening panels 38 secured thereto.

Referring to FIG. 13, the securing of the screening panel 38 of FIG. 12 is shown. The screening panel 38 is of polyurethane and has a protrusion 36 unitary with the screening panel 38. The protrusion 36 has a sloping face 36.1, a stem 36.2, and a step 36.3 between the stem 36.2 and the sloping face 36.1. The protrusion 36 is accommodated in the socket 26 defined In the tubular element 24 which is mounted In the cylindrical recess 22 formed by the coming into register of the semi-cylindrical depressions 16 in the elongate flat bars 12 and 14. The step 36.3 engages behind the annular, inwardly extending shoulder or peripheral lip 24.3 in the tubular element 24 and thereby secures the screening panel 38 on the tubular element 24 and on the screen support frame component 10 of the support frame 40 as shown in FIG. 12.

When two screening panels 38 are positioned side-by-side on the tubular element 24 and on the secured together flat bars 12 and 14, as shown in FIG. 13, one screening panel 38 being shown in solid lines and the other being shown in broken lines, the protrusions 36 on the screening panels are fitted in pairs in the socket 26 defined in the tubular element 24. The protrusions 36 are forced via their sloping surfaces 36.1 through the peripheral lip or shoulder 26.3 into the socket 26 until the steps 36.3 engage behind the shoulder 24.3. This is possible since the polyurethane of which the panels 38 and the protrusions 36 are made is resiliently deformable. When the steps 36.3 are thus positioned behind the shoulder 24.3 the panels 38 are secured on the screen support frame component 10 and thus onto the support frame 40.

The protrusions 36 on the screening panel 38 as shown in FIG. 13, are fixed protrusions. In an alternative arrangement, not shown, the protrusions 36 may be hollow and a separate pin (not shown) may be inserted through a cavity in the protrusion 36 to force it into engagement behind the shoulder 24.3.

In conventional screening arrangement support frames known to the Applicant, tubular socket members are machined out of steel and are welded into recesses which are cut into steel frame members, which is a relatively costly procedure. It is an advantage of the components 10 of the invention that they enable tubular socket elements 24 which are more cost effectively injection moulded of synthetic plastics material, to be received within cylindrical cavities 22, which are formed by semi-cylindrical depressions 16 which in turn are more cost effectively formed by punching them into the flat bars 12 and 14.

Furthermore, in the embodiment shown in FIG. 1 of the drawings, by having the tubular elements 24 separate from and removable from the elongate flat bars 12 and 14, the tubular elements 24 may be removed and replaced when necessary, in particular when the shoulder 24.3 in the tubular element 24 is worn. This is relatively easy to achieve by merely separating the elongate flat bars 12 and 14 from one another by loosening and removing nut and bolt assemblies 33 and 20, removing the tubular elements 24 and replacing them with new tubular elements 24, and then bolting the flat bars 12 and 14 to one another and to the support frame 40. The screen support frame components 10 can also be removed individually or modularly from a screen support frame 40 by loosening nut and bolt assemblies 33, and replacing the components 10 as desired. This is an advantageous feature of the screen support frame component and screen support frame 40 according to the invention, since the replacement of a component 10 and/or the tubular elements 24 can be effected relatively speedily, and a screen deck including the components 10 and tubular elements 24 may only be out of operation for a short while during replacement.

We claim:

1. A dismantable mineral ore separating screening arrangement support frame component comprising:

a pair of complementary elongate component members comprising body portions and cavity defining formations, and means for releasably securing the component members side by side to one another such that the body portions abut each other and the cavity defining formations register to form a plurality of cavities for receiving socket elements;

a plurality of replaceable socket elements, each defining a socket for receiving means for securing an ore screening panel to the support frame component, and means for releasably mounting said socket elements in the cavities when the component members are secured to one another, and the thickness of each screening arrangement support frame component where the body portions abut being smaller than the cross-sectional dimension of the socket elements which are mounted in the cavities.

2. A screening arrangement support frame which includes a plurality of mutually laterally spaced support beams; and a plurality of components in accordance with claim 1 removably connected to the support beams, the components being spaced from and parallel to each other and spaced apart from each other by a distance equivalent to the width of a screening panel.

3. A screening arrangement support frame as claimed in claim 2 which comprises a grid-like structure, which includes a plurality of said components releasably connected by connecting brackets or cleats to transversely extending support beams, the support beams being interconnected and held in mutually spaced relationship by a pair of opposed end beams.

4. A screening arrangement which includes a screening arrangement support frame in accordance with claim 2; and a plurality of screening panels having securing means received within the sockets to secure the screening panels to the support frame.

5. A screening arrangement support frame component as claimed in claim 1, wherein the component members comprise a pair of elongate flat bars, the cavity defining formations comprising a plurality of depressions spaced along their length, the depressions coming into register with one another when the elongate flat bars are secured to one another to form a plurality of cavities for receiving socket elements.

6. A component as claimed in claim 5 wherein a portion of an end of each elongate flat bar in the pair projects in an axial direction beyond the corresponding end of the other elongate flat bar in the pair, to provide an ear which overlaps with and is securable to a corresponding ear in another such component and to connecting means to connect the components to a support beam of a screening arrangement support frame.

7. A component at claimed in claim 5 wherein the depressions are semi-cylindrical such that when the semi-cylindrical depressions register, cylindrical cavities are formed in the screening arrangement support frame component.

8. A component as claimed in claim 7 wherein the releasable mounting means comprises, for each depression a formation complementary to and inter-engageable with a formation on the socket element, for locating the socket element in the cavity formed when the elongate flat bars are secured to one another.

9. A component as claimed in claim 8 wherein the socket elements are tubular elements formed so as to fit snugly within the cylindrical cavities.

10. A component as claimed In claim 9 wherein each tubular element has a circular cross-sectional profile defining a circular cylindrical socket in its interior, and a circular opening into the cylindrical interior of the element for receiving securing means in the form of protrusions on a screening panel.

11. A component as claimed in claim 10 wherein the circular opening into the tubular element is provided in a flat surface which is flush with the top surfaces of the elongate flat bars when the tubular element is mounted in the cylindrical cavity in the support frame component.

12. A component as claimed in claim 11 wherein the circular opening has an annular, inwardly extending shoulder or peripheral lip to engage the protrusions of the screening panel.

13. A component as claimed in claim 12 wherein the formation in each semi-cylindrical depression is a female formation and the formations on the tubular elements are male formations.

14. A component as claimed in claim 13 wherein the female formations are openings provided in a wall of the semi-cylindrical depression, and the male formations are pairs of integral projections of the socket elements, with each projection of the pair being provided on a side of the tubular element opposite to the other.

15. A component as claimed in claim 13 wherein the integral projections are in the form of integral lugs.

16. A component as claimed in claim 15 wherein the tubular elements are of a hard-wearing mouldable synthetic plastics material.

17. A component as claimed in claim 16 wherein the synthetic plastics material is polyurethane.

18. A component as claimed in claim 17 wherein the cavities in the component are spaced longitudinally from each other by distances complementary to spacings between securing means by means of which a screening panel is secured to the component.

19. A component as claimed in claim 18 wherein the component members are releasably secured to one another by releasable securing means and the socket elements are removably mounted in the cavities.

20. A component as claimed in claim 19 wherein the releasable securing means comprises a plurality of transversely extending holes provided along the length of each of said flat bars, at least some of which holes can be brought into register with one another; and a plurality of nut and bolt assemblies receivable through the plurality of holes for releasably securing said bars to one another.

* * * * *